United States Patent
Hu et al.

(10) Patent No.: US 9,323,334 B2
(45) Date of Patent: Apr. 26, 2016

(54) CONTROL SYSTEM WITH RIDGE INTERFACE AND METHOD OF OPERATION THEREOF

(71) Applicant: Samsung Electronics Co., Ltd., Gyeonggi-Do (KR)

(72) Inventors: Yuchang Hu, Santa Clara, CA (US); Anton Treskunov, Santa Clara, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 154 days.

(21) Appl. No.: 13/767,305

(22) Filed: Feb. 14, 2013

(65) Prior Publication Data

US 2013/0234941 A1     Sep. 12, 2013

Related U.S. Application Data

(60) Provisional application No. 61/608,079, filed on Mar. 7, 2012.

(51) Int. Cl.
| | |
|---|---|
| G06F 3/01 | (2006.01) |
| G06F 3/0488 | (2013.01) |
| G06F 3/033 | (2013.01) |
| G06F 3/0487 | (2013.01) |

(52) U.S. Cl.
CPC ............... *G06F 3/017* (2013.01); *G06F 3/033* (2013.01); *G06F 3/04883* (2013.01); *G06F 3/0487* (2013.01); *G06F 2203/04809* (2013.01)

(58) Field of Classification Search
CPC ..... G06F 3/017; G06F 3/0487; G06F 3/0488; G06F 3/04883; G06F 2203/04809; G06F 3/033; G06F 3/03547; G06F 3/03548; G06F 3/03549; H04N 21/42204; H04N 21/42206; H04N 21/42207; H04N 21/42208; H04N 5/4403
USPC ................ 345/156, 173; 715/740, 804, 863; 463/33; 726/19
See application file for complete search history.

(56) References Cited

U.S. PATENT DOCUMENTS

| | | | | |
|---|---|---|---|---|
| 5,909,207 A | * | 6/1999 | Ho | 345/156 |
| 5,982,355 A | * | 11/1999 | Jaeger | G02F 1/13306 345/161 |
| 6,636,202 B2 | * | 10/2003 | Ishmael et al. | 345/173 |
| 6,966,837 B1 | * | 11/2005 | Best | 463/33 |
| 7,057,579 B2 | * | 6/2006 | Hanson et al. | 345/2.1 |
| 8,018,431 B1 | | 9/2011 | Zehr et al. | |
| 8,054,294 B2 | | 11/2011 | Sakai et al. | |
| 8,587,548 B2 | * | 11/2013 | Ciesla et al. | 345/173 |
| 2002/0054030 A1 | * | 5/2002 | Murphy | 345/173 |
| 2004/0056847 A1 | * | 3/2004 | Yoshihara | G06F 3/03547 345/173 |
| 2004/0056877 A1 | * | 3/2004 | Nakajima | 345/702 |
| 2004/0164968 A1 | * | 8/2004 | Miyamoto | 345/173 |
| 2004/0233216 A1 | * | 11/2004 | Rekimoto et al. | 345/592 |

(Continued)

FOREIGN PATENT DOCUMENTS

| | | |
|---|---|---|
| JP | 2005057563 | 3/2005 |
| KR | 20110029058 | 3/2011 |
| KR | 1020110120132 | 11/2011 |

*Primary Examiner* — Larry Sternbane
*Assistant Examiner* — Darlene M Ritchie
(74) *Attorney, Agent, or Firm* — IP Investment Law Group

(57) ABSTRACT

A control system includes: a ridge interface configured to perform a gesture therewith; and a control unit, coupled to the ridge interface, configured to interpret the gesture for controlling a device.

20 Claims, 9 Drawing Sheets

(56) References Cited

U.S. PATENT DOCUMENTS

| | | | |
|---|---|---|---|
| 2006/0238510 A1* | 10/2006 | Panotopoulos et al. | 345/168 |
| 2008/0055255 A1* | 3/2008 | Griffin | G06F 1/1626 345/173 |
| 2009/0042619 A1* | 2/2009 | Pierce et al. | 455/566 |
| 2009/0083850 A1* | 3/2009 | Fadell et al. | 726/19 |
| 2009/0135150 A1* | 5/2009 | Takashima | G06F 3/041 345/173 |
| 2009/0289917 A1* | 11/2009 | Saunders | 345/174 |
| 2010/0083188 A1* | 4/2010 | Pance et al. | 715/863 |
| 2010/0127975 A1* | 5/2010 | Jensen | G06F 3/03547 345/157 |
| 2010/0205667 A1* | 8/2010 | Anderson et al. | 726/19 |
| 2011/0109550 A1* | 5/2011 | Shih et al. | 345/163 |
| 2011/0246904 A1* | 10/2011 | Pinto et al. | 715/740 |
| 2012/0050183 A1* | 3/2012 | Lee | 345/173 |
| 2012/0242592 A1* | 9/2012 | Rothkopf | G06F 1/1652 345/173 |
| 2014/0230049 A1* | 8/2014 | Fadell et al. | 726/19 |

* cited by examiner

CONTROL SYSTEM WITH RIDGE INTERFACE AND METHOD OF OPERATION THEREOF

CROSS-REFERENCE TO RELATED APPLICATION(S)

This application claims the benefit of U.S. Provisional Patent Application Ser. No. 61/608,079 filed Mar. 7, 2012, and the subject matter thereof is incorporated herein by reference thereto.

TECHNICAL FIELD

An embodiment of the present invention relates generally to a control system, and more particularly to a system for controlling an electronic system.

BACKGROUND

Modern consumer and industrial electronics, especially devices such as graphical display systems, televisions, projectors, cellular phones, portable digital assistants, and combination devices, are providing increasing levels of functionality to support modern life including three-dimensional display services. Research and development in the existing technologies can take a myriad of different directions.

One resulting technology can provide multiple multimedia applications a control from one device to another. As users become more empowered with the growth of user interface for portable or remote devices or even non-portable device, new and old paradigms begin to take advantage of this new device space. There are many technological solutions to take advantage of this user interface to control and interact with a device or between devices. However, the tools available are often not efficient for adequately and easily controlling devices.

Thus, a need still remains for a control system to provide user for controlling devices with more control options in a simplified configuration and in a compact form factor. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a control system, including: a ridge interface configured to perform a gesture therewith; and a control unit, coupled to the ridge interface, configured to interpret the gesture for controlling a device.

An embodiment of the present invention provides a method of operation of a control system including: performing a gesture on a ridge interface of a first device; and interpreting the gesture with a control unit for controlling a second device.

An embodiment of the present invention provides a method of operation of a control system including: receiving a command for interacting with a first device based on a gesture on a ridge interface of a first device; and operating a second device based on the command and a current state of the second device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
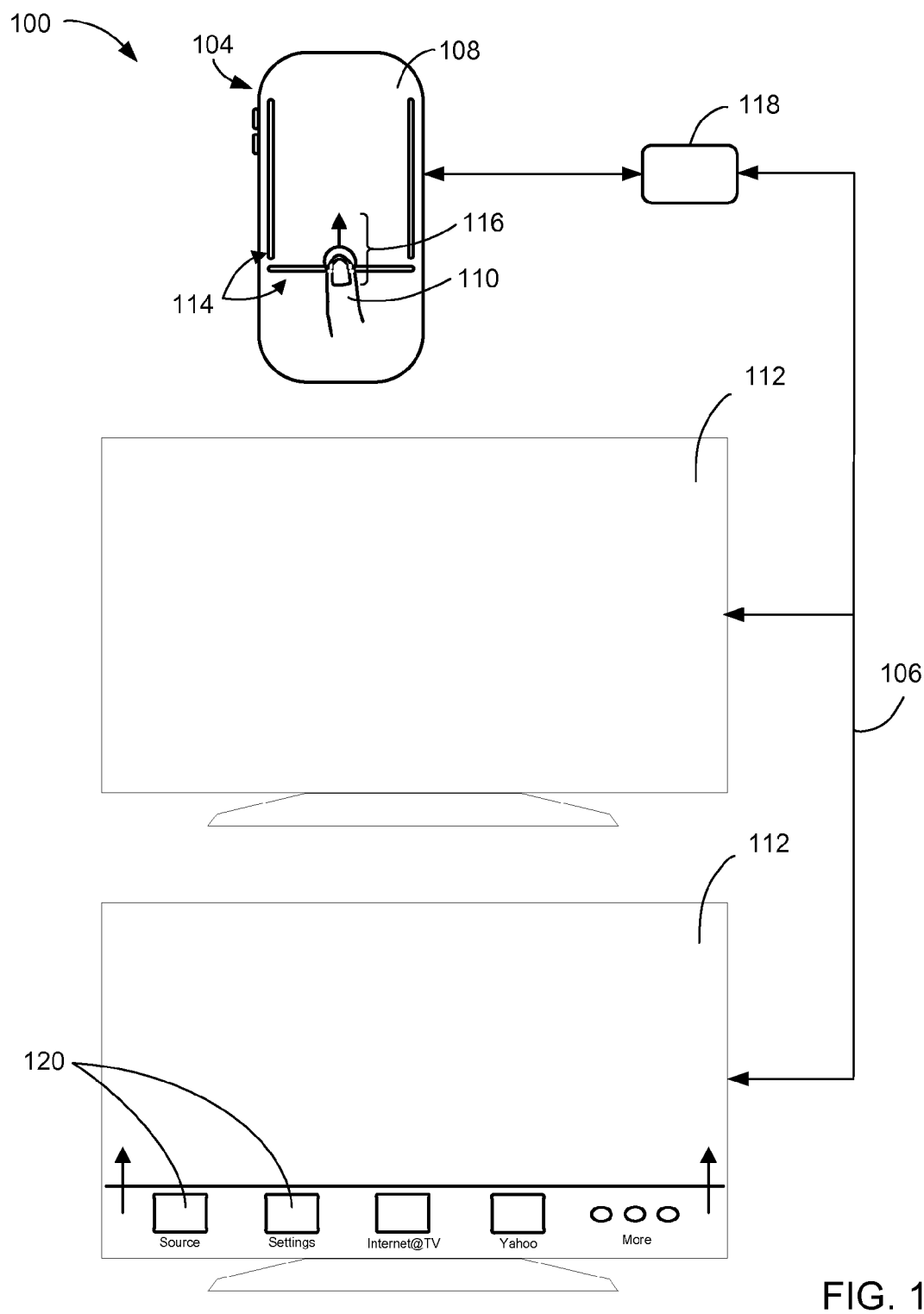
FIG. 1 is a control system in a first example in an embodiment of the present invention.

In an embodiment of the present invention, the control system can provide control of the second device of FIG. 1 from the first device of FIG. 1 with the use of only the single finger of FIG. 1 and without having to look at the first device while trying to control or interact with the second device. The physical protrusion of the ridge interface of FIG. 1 allows the identification of the relative position of the single finger on the first device. The relative position allows a user to perform the gesture of FIG. 1 from the starting position from one side of the ridge interface to the opposite side while maintaining physical contact of the ridge interface throughout the gesture. The direction of the gesture and the relative control of the display on the second device swiping from the bottom also allows of the user to easily control the second device without having to look at the first device.

In an embodiment of the present invention, the control system can also provide a safe user interface. The first device can be used in a crowded or dangerous environment where having prolonged visual attention on the first device can create a hazardous situation for the user of the first device. The tactic identification with the physical protrusion of the ridge interface as well as similarity of control upon the display on the second device as the type of the gesture on the first device allows the user to focus on the second device or the environment without visually focusing on the first device.

In an embodiment of the present invention, the control system can further provide a robust control user interface with the use of only the single finger. This allows effective and robust control of the second device with only the use of one hand and the single finger from the same hand.

Figure 2:
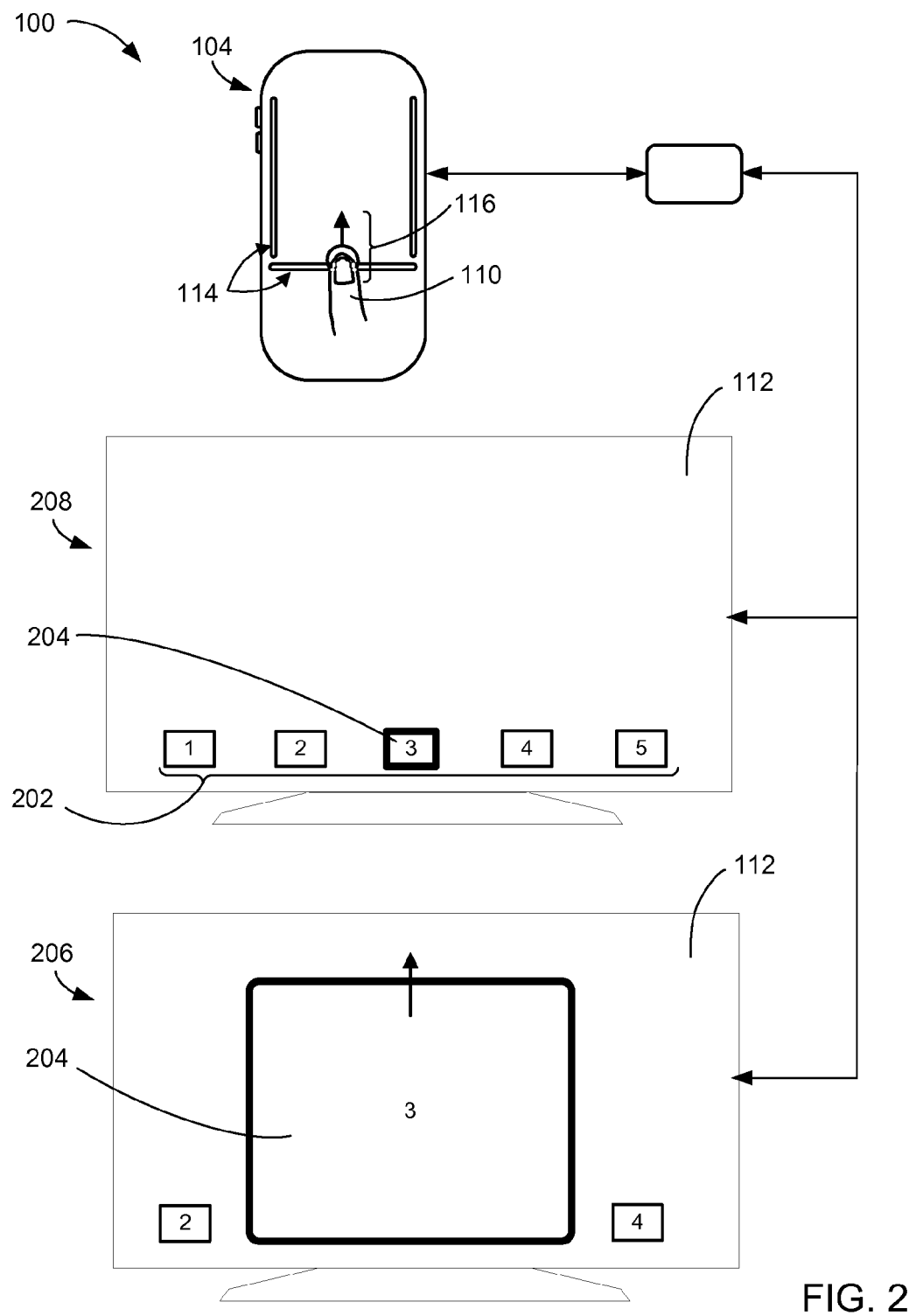
FIG. 2 is the control system in a second example.

In an embodiment of the present invention, the control system can allow multiple function control using the same type of the gesture. The control of the second device with the gesture can vary depending on the current state of FIG. 2 of the second device when the gesture is invoked. In other words, the same gesture can be different effect on the second device depending on the current state. In this example, the current state of the second device is shown as a first state. The first state has the discrete control icons of FIG. 2 shown on the second device. As described in more details in FIG. 1, the swiping across the ridge interface controls a display being presented in a swiping manner from the bottom of the display of the second device without regard to the location of the start of the gesture along the length-wise dimension of the ridge interface. However, as described more below in FIG. 2, the location of the start of the gesture as well as the direction of the swipe of the gesture has a different control effect because of the current state as the first state of FIG. 2 of the second device when the gesture is invoked. In FIG. 2, the discrete control icons are already displayed on the second device before the invocation of the gesture.

In an embodiment of the present invention, the control system that allows for reliable control of the second device by not requiring the precise location of the single finger along the ridge interface to match the relative position of the target icon on the second device. The start of the gesture in this example can default to select the middle available selection and the selection can be changed by the gesture that is a swiping action along the ridge interface. This allows reliable control without requiring precise relative position of the single finger along the ridge interface to match the selection on the second device. This also allows the selection of the discrete control icons without requiring visual attention to the first device.

In an embodiment of the present invention, the control system provides immediate and one-touch control to predetermined options among a numerous options. This allows quick control from the first device to the second device to use the lengthwise ends to invoke controls to the corresponding ends shown on the display of the second device, as described in FIG. 4 and FIG. 5, as examples. This end control avoids unnecessary gestures if the ends are desired or more expedient without visual attention to the first device as well as to minimize tactile attention to the first device. This is not possible if there is only a single point control or a touch screen without discernible end.

In an embodiment of the present invention, the control system can provide quick and reliable control of the second device because the relative position maps to the location of the control that can be displayed on the second device without unnecessary control steps that needs to be performed on the first device. This mapping of the ridge left interface of FIG. 6, the ridge right interface of FIG. 6, and the ridge base interface of FIG. 6 on the first device to the relative position on the second device avoids the need for visual attention on the first device and minimizes the tactile attention and operation on the first device.

In an embodiment of the present invention, the control system can provide security protection as well as control interface. The ridge interface can be a multi-purpose interface that provides not only control interface to the second device with the use of the gesture but can also function as the user authentication of FIG. 7 as the gesture interact with the ridge interface.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. Where the embodiments have been numbered first embodiment, second embodiment, etc., the ordinal designation is as a matter of descriptive convenience and are not intended to have any other significance or provide limitations for an embodiment of the present invention.

One skilled in the art would appreciate that the format with which image information is expressed is not critical to some embodiments of the invention. For example, in some embodiments, image information is presented in the format of (X,Y); where X and Y are two coordinates that define the location of a pixel in an image.

In an alternative embodiment, three-dimensional image information is presented by a format of (X, Y, Z) with related information for color of the pixel. In a further embodiment of the present invention, the three-dimensional image information also includes an intensity or brightness element.

The term "image" referred to herein can include a two-dimensional image, three-dimensional image, video frame, a computer file representation, an image from a camera, a video frame, or a combination thereof. For example, the image can be a machine readable digital file, a physical photograph, a digital photograph, a motion picture frame, a video frame, an x-ray image, a scanned image, or a combination thereof.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a control system 100 with ridge interface in an embodiment of the present invention. The control system 100 can include a first device 104. The first device 104 is defined as an apparatus having digital or analog circuitry. For example, the first device 104 can be of any of a variety of mobile devices, such as a remote controller, an e-reader, a cellular phone, personal digital assistant, a notebook computer, a tablet PC, a table top computer, a smart surface, or other multi-functional mobile communication or entertainment device. As example, the first device 104 can be a particularized machine, such as a portable computing device, a thin client, a notebook, a netbook, a smartphone, personal digital assistant, or a cellular phone, and as specific examples, a Samsung Galaxy Tablet (™), an Apple iPad (™), or an Apple iPhone (™).

The first device 104 can be a standalone device, or can be incorporated with a larger electronic system, for example a home theatre system, a personal computer, or a vehicle. The first device 104 can couple to a communication path 106 to communicate with a second device 112, such as external displays.

For illustrative purposes, the first device 104 is described as a mobile computing device, although it is understood that the first device 104 can be different types of computing devices. For example, the first device 104 can also be a non-mobile computing device, such as an entertainment center, television, or a large and stationary display.

The communication path 106 can be a variety of networks. For example, the communication path 106 can include wireless communication, wired communication, optical, ultrasonic, or a combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include direct connection, personal area network (PAN), local area network (LAN), metropolitan area network (MAN), wide area network (WAN) or any combination thereof.

FIG. 1 depicts the first device 104 having a ridge interface 114. The ridge interface 114 is defined as a physical protrusion from a display interface 108 of the first device 104. The ridge interface 114 allows for a sequence of gestures to be performed on the first device 104 to control the first device 104, the second device 112, or a combination thereof. A gesture 116 is defined as a physical action involving physical contact with the ridge interface 114 whereby the physical action upon the ridge interface 114 involve more than a physical pressing upon the ridge interface 114. The first device 104 and the ridge interface 114 will be discussed in more detail below.

FIG. 1 further depicts an interaction and a control of the second device 112, shown as an external display or television in this example. As an example, the middle illustration in FIG. 1 depicts the second device 112 before any interaction or control by the first device 104. FIG. 1 depicts the gesture 116 using only a single finger 110 over one of the ridge interface 114. The gesture 116 in this example is the physical contact and movement of the single finger 110 from one side of the ridge interface 114 to the other end of the ridge interface 114. The continuous contact and the gesture 116 with the single finger 110 at the first device 104 interacts and controls the second device 112 through commands 118 from the first device 104 to the second device 112. This continuous type of the gesture 116 is depicted by the circle under the single finger 110 and the direction of the arrow extending from the circle represents the movement of the single finger 110.

The commands 118 can be instructions, such as directional commands for cursor movement on the second device 112 or operational commands for an application running on the second device 112. The commands 118 can also be coordinates for the moving the cursor position on the display of the second device 112. The commands 118 can be over the communication path 106.

For illustrative purposes, the gesture 116 is described as starting from one side of the ridge interface 114 to the opposite of the ridge interface 114, although it is understood that the starting and ending points of the gesture 116 can differ. For example, the gesture 116 can start on top of the ridge interface 114 and end on one side of the ridge interface 114.

As another example, the gesture 116 can start from one side of the ridge interface 114 and end on top of the ridge interface 114.

In this example, the gesture 116 described above controls what is displayed on the second device 112. The gesture 116 upon the ridge interface 114 of the first device 104 causes the second device 112 to show some settings 120 or controls for the second device 112 at the bottom of the display. The presentation of the settings 120 or the controls can be shown swiping from the bottom of the display of the second device 112 to match or resemble the gesture 116 on the first device 104. The two upward arrows in the bottom illustration of FIG. 1 depict the swipe action from the bottom of the display of the second device 112.

It has been discovered that the control system 100 provides control of the second device 112 from the first device 104 with the use of only the single finger 110 and without having to look at the first device 104 while trying to control or interact with the second device 112. The physical protrusion of the ridge interface 114 allows the identification of the relative position of the single finger 110 on the first device 104. The relative position allows a user to perform the gesture 116 from the starting position from one side of the ridge interface 114 to the opposite side while maintaining physical contact of the ridge interface 114 throughout the gesture 116. The direction of the gesture 116 and the relative control of the display on the second device 112 swiping from the bottom also allows of the user to easily control the second device 112 without having to look at the first device 104.

It has also been discovered that the control system 100 provides a safe user interface. The first device 104 can be used in a crowded or dangerous environment where having prolonged visual attention on the first device 104 can create a hazardous situation for the user of the first device 104. The tactic identification with the physical protrusion of the ridge interface 114 as well as similarity of control upon the display on the second device 112 as the type of the gesture 116 on the first device 104 allows the user to focus on the second device 112 or the environment without visually focusing on the first device 104.

It has been further discovered that the control system 100 provides a robust control user interface with the use of only the single finger 110. This allows effective and robust control of the second device 112 with only the use of one hand and the single finger 110 from the same hand.

Referring now to FIG. 2, there is shown the control system 100 in a second example. In this example, the gesture 116 upon the ridge interface 114 of the first device 104 appears similar to the gesture 116 shown in FIG. 1. The control or interaction on the second device 112 differs than that shown in FIG. 1 because of a state of the second device 112 when the gesture 116 is invoked on the first device 104.

In this example, the second device 112 is shown with some discrete control icons 202 near the bottom of the display of the second device 112 before the gesture 116 is invoked in the middle illustration. As the gesture 116 is invoked, the relative location of the single finger 110 along the length-wise direction of the ridge interface 114 can select one of the discrete control icons 202. Here, the single finger 110 is shown near the middle of the ridge interface 114 causing the selection of a target icon 204, which has been highlighted, of the discrete control icons 202 to be highlighted.

As the gesture 116 is performed, the target icon 204 can mimic the action similar to the gesture 116 performed on the first device 104. In this example, the gesture 116 is as described in FIG. 1 on the first device 104 causing or controlling the second device 112 to selected one of the discrete control icons 202 to also grow in size as if the gesture 116 caused the upper border of the target icon 204 to be moved upwards in the direction of the gesture 116 while simultaneously resizing the target icon 204 to be larger.

It has been discovered that the control system 100 allows multiple function control using the same type of the gesture 116. The control of the second device 112 with the gesture 116 can vary depending on a current state 206 of the second device 112 when the gesture 116 is invoked. In other words, the same gesture can be different effect on the second device 112 depending on the current state 206. In this example, the current state 206 of the second device 112 is shown as a first state 208. The first state 208 has the discrete control icons 202 shown on the second device 112. As in FIG. 1, the swiping across the ridge interface 114 controls a display being presented in a swiping manner from the bottom of the display of the second device 112 without regard to the location of the start of the gesture 116 along the length-wise dimension of the ridge interface 114. However, as described above in FIG. 2, the location of the start of the gesture 116 as well as the direction of the swipe of the gesture 116 has a different control effect because of the current state 206 as the first state 208 of the second device 112 when the gesture 116 is invoked. Here in FIG. 2, the discrete control icons 202 are already displayed on the second device 112 before the invocation of the gesture 116.

Figure 3:
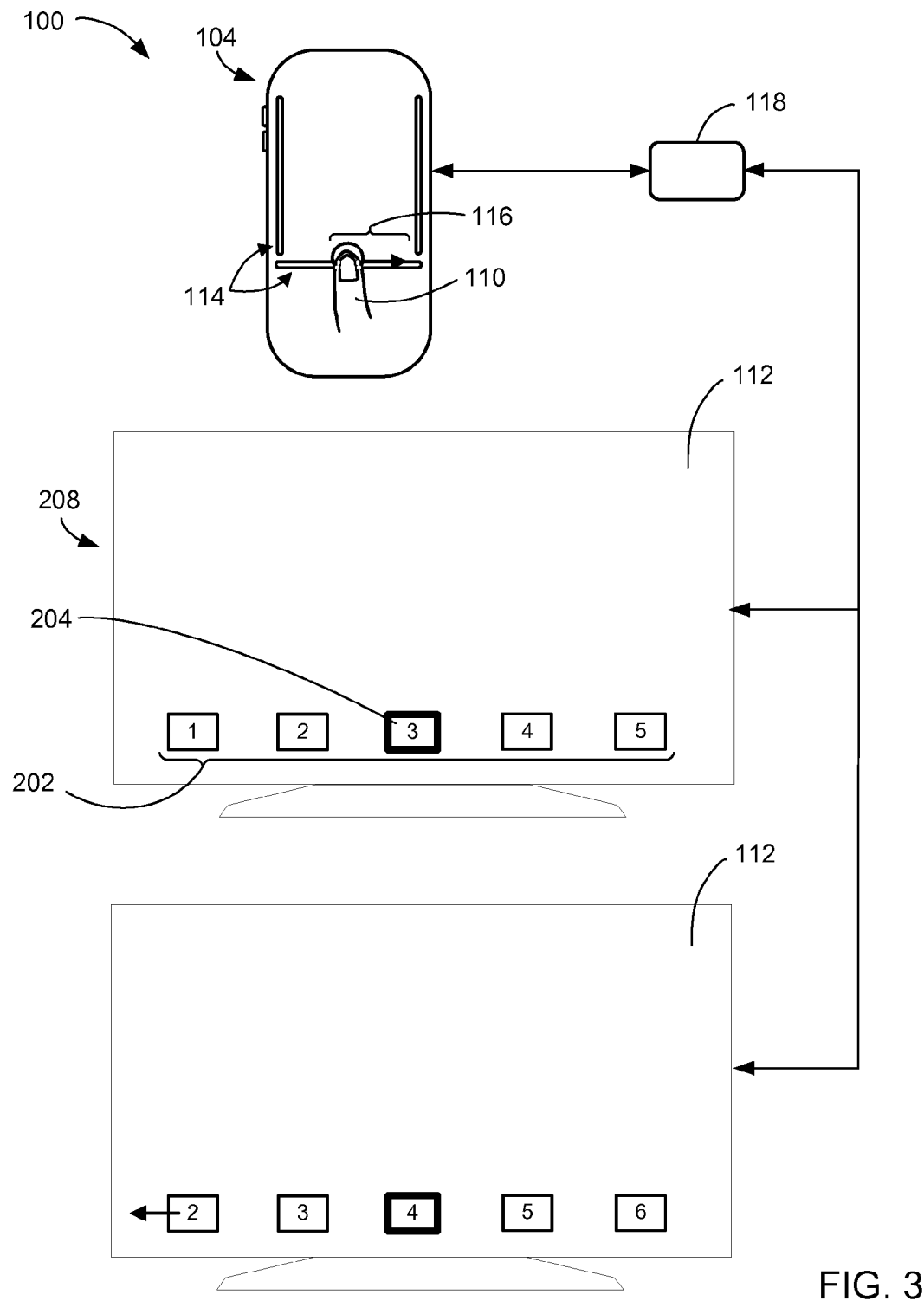
FIG. 3 is the control system in a third example.

Referring now to FIG. 3, therein is shown the control system 100 in a third example. In this example, the second device 112 is shown in the same state as the first state 208 as in FIG. 2 before the invocation of the gesture 116 in the middle illustration in FIG. 3. As in FIG. 2, the starting location of the gesture 116 selects the one of the discrete control icons 202. For brevity and consistency to the description in FIG. 2, the selected icon is also referred to in this figure as the target icon 204. As the gesture 116 continues along the ridge interface 114, the selection of the discrete control icons 202 changes as a highlight along the direction of the gesture 116 swipe. This can be used to input numbers.

As the gesture 116 moves along the ridge interface 114, the commands 118 from the first device 104 to the second device 112 can be either directional commands or coordinates. The directional commands can move the cursor on the second device 112 from one of the discrete control icons 202 to another. The coordinates can also move from one of the discrete control icons 202 to another but can also move the cursor between the discrete control icons 202.

It has been discovered that the control system 100 that allows for reliable control of the second device 112 by not requiring the precise location of the single finger 110 along the ridge interface 114 to match the relative position of the target icon 204 on the second device 112. The start of the gesture 116 in this example can default to select the middle available selection and the selection can be changed by the gesture 116 that is a swiping action along the ridge interface 114. This allows reliable control without requiring precise relative position of the single finger 110 along the ridge interface 114 to match the selection on the second device 112. This also allows the selection of the discrete control icons 202 without requiring visual attention to the first device 104.

Figure 4:
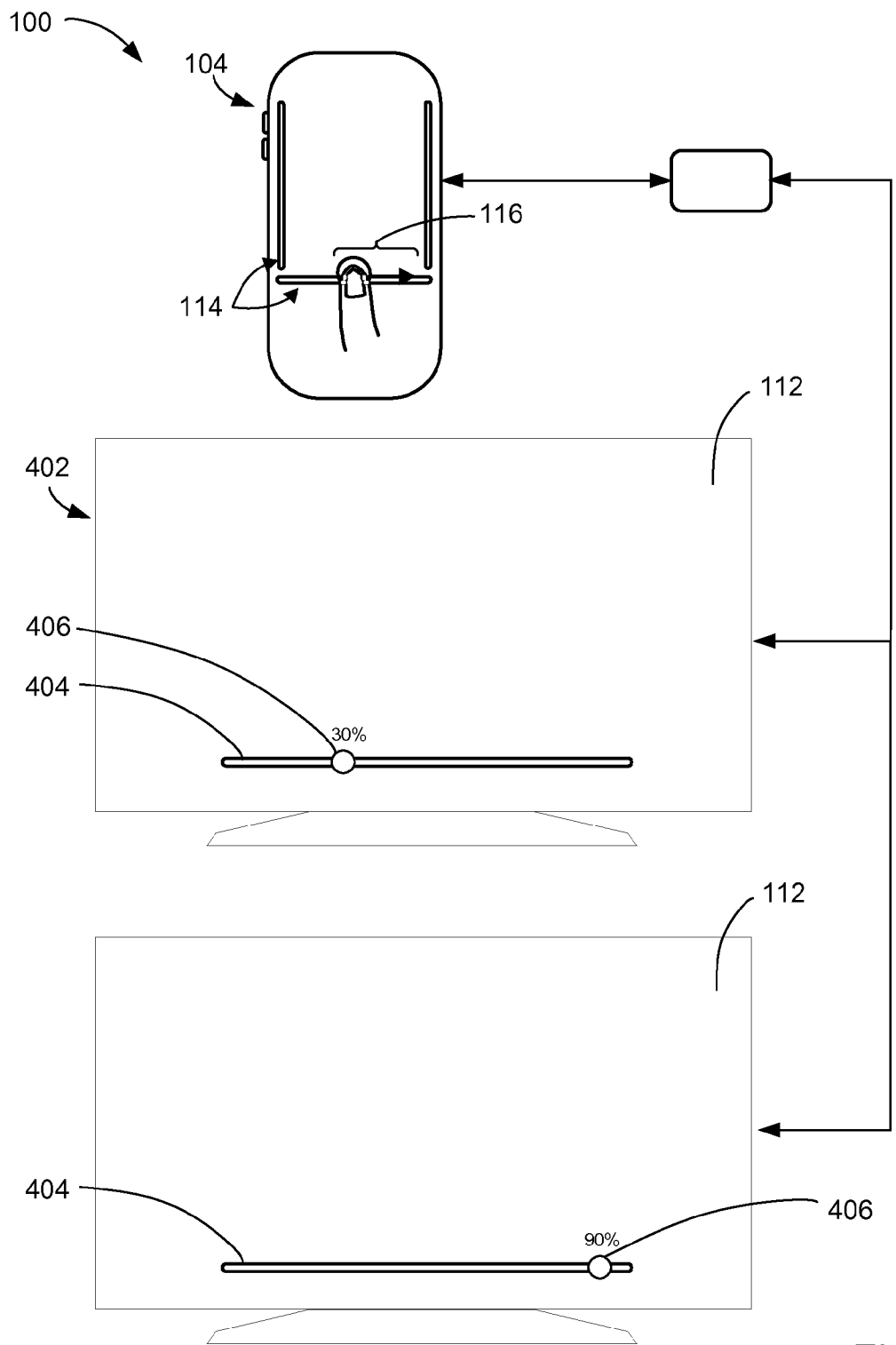
FIG. 4 is the control system in a fourth example.

Referring now to FIG. 4, therein is shown the control system 100 in a fourth example. The gesture 116 depicted in this example is similar to that shown and described in FIG. 3. However, the second device 112 is in a second state 402 that differs from the first state 208 of the second device 112 in FIG. 3.

The second state 402 of the second device 112 before the invocation of the gesture 116 in this figure depicts a control scale 404 and a control point 406 along the control scale 404. The start of the gesture 116 in this figure can select the control point 406 on the control scale 404. As the gesture 116 continues movement along the lengthwise direction of the ridge interface 114, the control point 406 can also move along the control scale 404 in the same direction.

As an example, the control scale 404 can provide control for a number of functions, such as volume control, brightness control, contrast control, scaling control between the first device 104 and the second device 112, or sensitivity control for the ridge interface 114. The control point 406 can represent the set point along the control scale 404.

Figure 5:
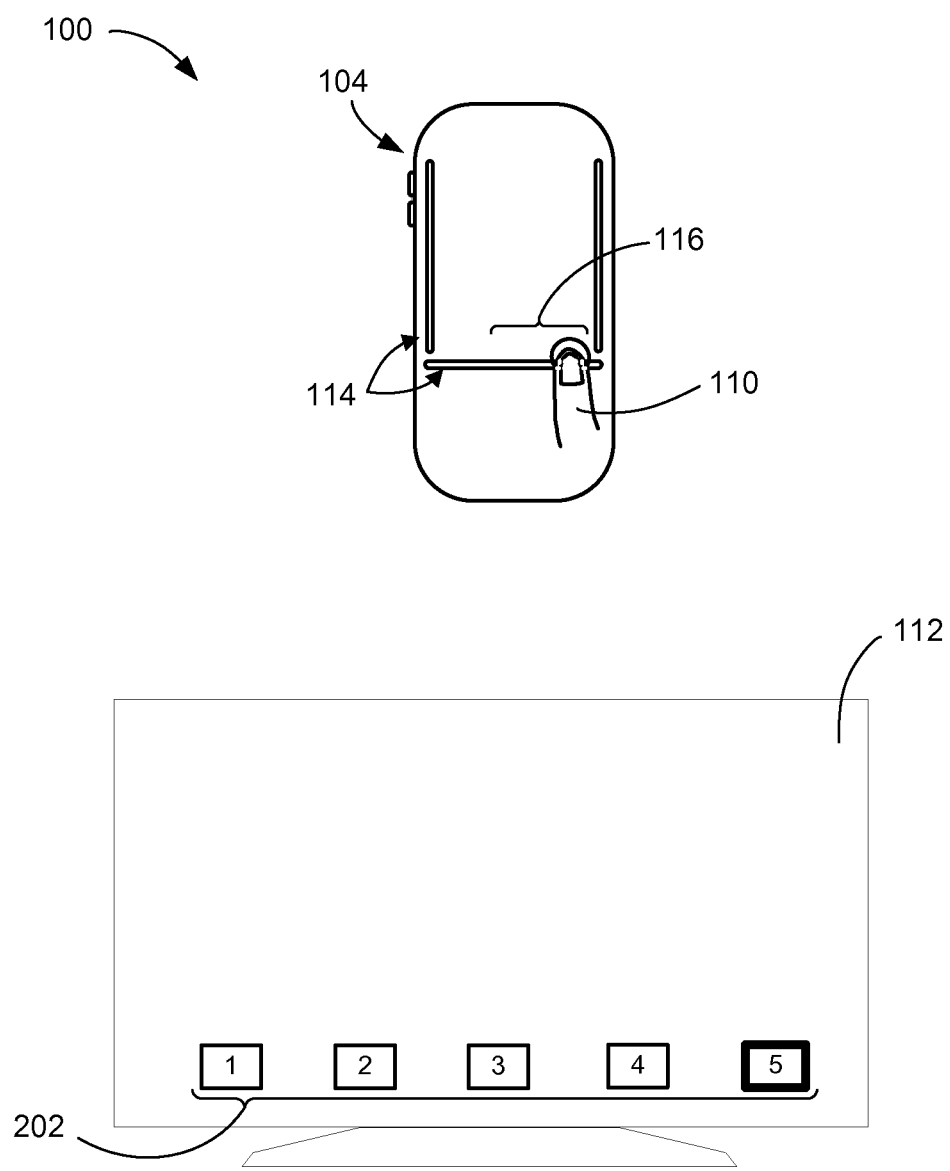
FIG. 5 is the control system in a fifth example.

Referring now to FIG. 5, therein is the control system 100 in a fifth example. In this example, the gesture 116 is shown to be invoked at a lengthwise end of the ridge interface 114. The gesture 116 at the end can invoke a control or selection to a similar end on the second device 112 as highlighted.

This figure shows the single finger 110 is at the right side end of the ridge interface 114 causing a selection of the discrete control icons 202 also at the very right side end of available options for selection as highlighted. This end control can also be used for the control point 406 of FIG. 4 to move the control point 406 to the corresponding end of the control scale 404 of FIG. 4.

It has been discovered that the control system 100 provides immediate and one-touch control to predetermined options among a numerous options. This allows quick control from the first device 104 to the second device 112 to use the lengthwise ends to invoke controls to the corresponding ends shown on the display of the second device 112, as described in FIG. 4 and FIG. 5, as examples. This end control avoids unnecessary gestures if the ends are desired or more expedient without visual attention to the first device 104 as well as to minimize tactile attention to the first device 104. This is not possible if there is only a single point control or a touch screen without discernible end.

Figure 6:
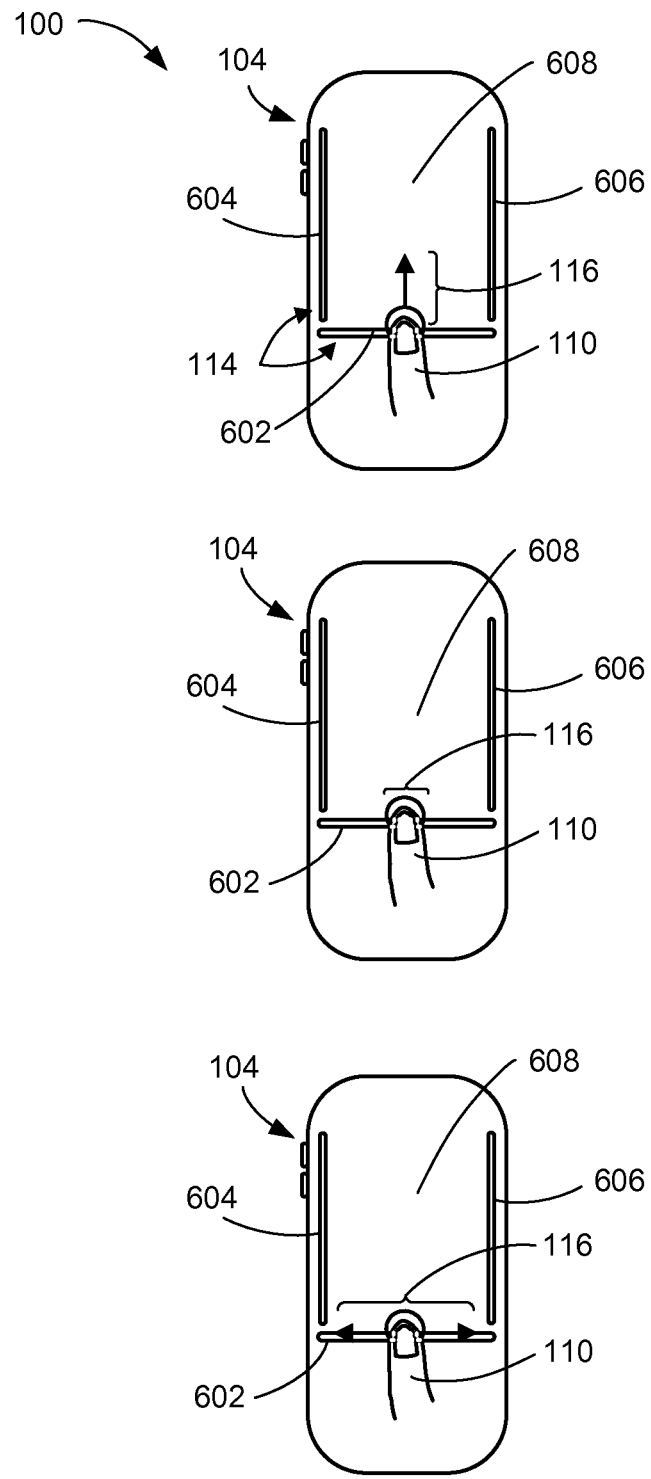
FIG. 6 is the first device depicted with operational examples.

Referring now to FIG. 6, therein is shown the first device 104 depicted with operational examples. In FIG. 6, the first device 104 is depicted with three instances of the ridge interface 114. The ridge interface 114 includes a ridge base interface 602, a ridge left interface 604, and a ridge right interface 606.

The ridge base interface 602 is the one shown in a horizontal orientation and in perpendicular configuration to the ridge left interface 604 and the ridge right interface 606, as an example. The ridge left interface 604 is shown at the left end of the ridge base interface 602. The ridge right interface 606 is shown at the right end of the ridge interface 114. For clarification, the ridge interface 114 discussed from FIG. 1 through 5 refers to the ridge base interface 602, as an example.

The ridge interface 114 creates a tactile spatial reference; in other words, the ridge interface 114 provides haptic feedback to mark an area on a trackpad 608 of the first device 104. The ridge interface 114 is especially important for one hand interaction with the first device 104 functioning as a remote control, for example, a TV remote control (FIG. 1 to FIG. 5), where edges of the remote are inconvenient to reach and visual attention is directed towards the main screen.

New set of gestures, which are inconvenient to perform with the single finger 110, becomes possible with addition of tracking on the trackpad 608. For example, one can swipe across the ridge interface 114, track the single finger 110 along the ridge interface 114 or click on the ridge interface 114. As an example, the following actions could be invoked:
  Pull/push a graphical user interface (GUI) item(s) to a certain direction (swipe);
  Enlarge/reduce a GUI item(s) (swipe);

Scroll a GUI item(s) (track);
Input a numeric value (track);
Move a GUI item(s) (track).

The ridge interface 114 can also be used as a physical button, adding accessibility support.

FIG. 6 depicts the first device 104 with three different examples of the gesture 116 utilizing the ridge interface 114. One example is as described and shown in FIGS. 1 and 2 where the gesture 116 starts at one side of the ridge base interface 602 and ends at the opposite side of the ridge base interface 602.

The other example shown depicts a single point of contact on the ridge base interface 602. The single contact alone can function as a control to the second device 112 of FIG. 5 or can represent a starting point for the gesture 116 as in FIG. 3 and in FIG. 4.

The third example in this figure depicts the gesture 116 or perhaps multiple gestures on and along the lengthwise direction of the ridge base interface 602, in one direction similar to that described and shown in FIG. 3 and in FIG. 4.

Similar to the ridge base interface 602 in the horizontal orientation, the ridge left interface 604 and the ridge right interface 606 in the vertical orientation are also physical protrusion from the trackpad 608 of the first device 104. The ridge left interface 604 and the ridge right interface 606 can also perform similar functions as the ridge base interface 602.

For example, the ridge left interface 604 can provide control for the control or setting options (not shown) along the corresponding left side of the second device 112. Similarly, the ridge right interface 606 can provide control for the control or setting options (not shown) along the corresponding right side of the second device 112.

It has been discovered that the control system 100 provides quick and reliable control of the second device 112 because the relative position maps to the location of the control that can be displayed on the second device 112 without unnecessary control steps that needs to be performed on the first device 104. This mapping of the ridge left interface 604, the ridge right interface 606, and the ridge base interface 602 on the first device 104 to the relative position on the second device 112 avoids the need for visual attention on the first device 104 and minimizes the tactile attention and operation on the first device 104.

Also, the control system 100 allows the gesture 116 to utilize the ridge base interface 602, the ridge left interface 604, and the ridge right interface 606 both in the horizontal and vertical orientation. For example if the second device 112 has a display item, the gesture 116 that has the single finger 110 simultaneously in contact with an end portion of the ridge base interface 602 and with either an end portion of the ridge left interface 604 or an end portion of the ridge right interface 606 can cause the display to be zoomed in or zoomed out.

If the single finger 110 is in contact at the exterior facing side of the ridge base interface 602 and with either the ridge left interface 604 or the ridge right interface 606, then the display item can be zoomed in. Two rapid taps at this location can enlarge the display item to full screen display mode. If the single finger 110 is in contact at the interior facing sides of the ridge base interface 602 and with either the ridge left interface 604 or the ridge right interface 606, then the display item can be zoomed out. Also, two rapid taps at this location can reduce the display item from full screen display mode.

Further, the gesture 116 can be performed with a sequence involving adjacent ends or non-adjacent ends of the ridge base interface 602 with either the ridge left interface 604 or the ridge right interface 606 as well as opposite ends the ridge base interface 602. The ridge base interface 602, the ridge left interface 604, or the ridge right interface 606 can also provide unique control functions. With an electronic reader (not shown) example displayed on the second device 112, the gesture 116 to the rightmost end of the ridge base interface 602 shown in FIG. 6 can represent movement of the cursor along a page (not shown). The gesture 116 that starts with contact at adjacent ends and proceeding with a swipe along the ridge base interface 602 can invoke a page turn for an electronic book or a web page shown on the second device 112.

The portion of the first device 104 bounded by the ridge base interface 602, the ridge left interface 604, and the ridge right interface 606 can represent a display for the first device 104. The display can be a touch screen pad or the trackpad 608 that can also be used in conjunction or separately from the ridge base interface 602, the ridge left interface 604, and the ridge right interface 606 to control the second device 112 from the first device 104. The portion of the first device 104 immediately next to and peripheral to the ridge base interface 602, the ridge left interface 604, and the ridge right interface 606 can be void of sensors for the touch screen pad.

Figure 7:
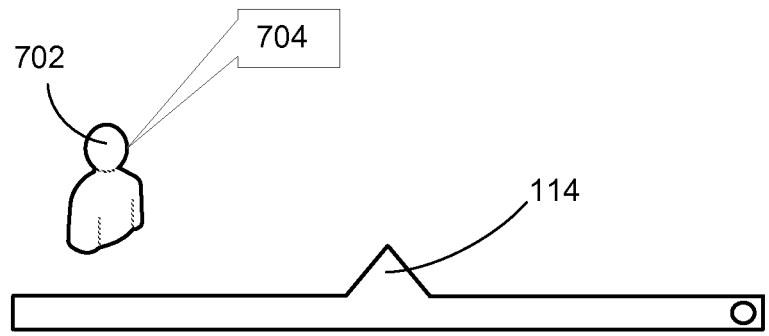
FIG. 7 is a cross-sectional view of a first example of the ridge interface.

Referring now to FIG. 7, therein is shown a cross-sectional view of a first example of the ridge interface 114. FIG. 7 can depict either the ridge base interface 602 of FIG. 6, the ridge left interface 604 of FIG. 6, or the ridge right interface 606 of FIG. 6.

In this example, the cross-sectional view depicts the ridge interface 114 protruding from the surface of the first device 104 and more specifically from the display of the first device 104. This example depicts the ridge interface 114 as a rigid protrusion and continuous from the display of the first device 104. The ridge interface 114 extends across majority or more than half of a dimension of the display of the first device 104. The ridge interface 114 can extend across majority of a width. The ridge interface 114 can extend across majority of a length orthogonal to the width.

This example depicts the sensing portion for the gesture 116 of FIG. 1 surrounding the ridge interface 114 along the display portion and not necessarily with the ridge interface 114 itself. The gesture 116 involving the ridge interface 114 will be sensed by the display portion immediately next to the ridge interface 114.

As a further example, the ridge interface 114 itself can also have sensing functions in addition to the sensors of the display portion immediately next to the ridge interface 114. The sensor can be capacitive sensor, electrostatic sensors, or thermal sensors, as examples.

The ridge interface 114 also function as security controls for operating the first device 104. For example, the gesture 116 involving the ridge interface 114 can continuously identify the user of the first device 104 by authenticating the single finger 110 as it swipes along or over the ridge sensor.

It has been discovered that the control system 100 provides security protection as well as control interface. The ridge interface 114 can be a multi-purpose interface that provides not only control interface to the second device 112 with the use of the gesture 116 but can also function as a user authentication 702 as the gesture 116 interact with the ridge interface 114.

The security protection can be continuous for each time the gesture 116 is used that involves the ridge interface 114. The security protection can be periodic at a given period of time or at a beginning of the usage session of the first device 104. The security protection can be invoked based on the content being controlled on the first device 104, the second device 112, or a combination thereof.

For example, if the second device 112 is being used to watch adult content entertainment, the control system 100 can function with the first device 104 to authenticate the user of the first device 104. The first device 104 can authenticate the user as having authorization to view such content or provide parental control without requiring separate authentication steps or inquiry and would be seamless and transparent to the user.

The security protection can be discreet not allowing the user that does not have access to know where authentication has been granted or not. In other words, the user authentication 702 can be done without a user's knowledge 704 that authentication is being performed. The lack of the user's knowledge 704 does not mean that the user does not know or is not aware of an authentication process but rather does not know if the authentication is being done or whether not if succeeded or failed. In other words, there is no notification or query for the user authentication 702 nor is there any user notification that the user authentication 702 failed or was successful.

For example, if the second device 112 functions as a web browser, access to bank account or private information can be hidden to a user who does not have that authorization. The unauthorized content can be hidden from the user without the user's knowledge 704. The authentication can be done at the first usage of the first device 104 for a particular use session so unauthorized content will never be displayed to the unauthorized user, the user authentication 702 failed, to avoid potential attempts to obtain access to the secured information or sites.

The security protection can also provide logs of users of the first device 104 as well as their activities. This allows tracking and potential accounting of usage. The logging can be continuous for every invocation of the gesture 116 or can be based in different application or usage of the second device 112. The logging can be done in conjunction with the user authentication 702 whether the authentication failed or was successful.

Figure 8:
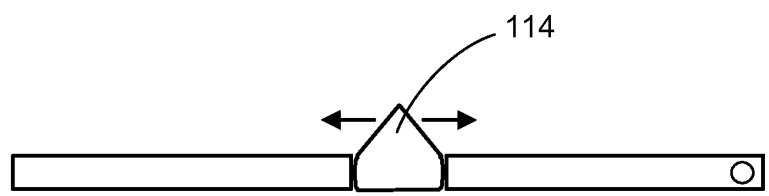
FIG. 8 is a cross-sectional view of a second example of the ridge interface.

Referring now to FIG. 8, therein is shown a cross-sectional view of a second example of the ridge interface 114. FIG. 8 can depict either the ridge base interface 602 of FIG. 6, the ridge left interface 604 of FIG. 6, or the ridge right interface 606 of FIG. 6.

In this example, the ridge interface 114 is shown as protruding from the display of the first device 104 similarly to that shown in FIG. 7. The ridge interface 114 in this example is not a contiguous element as part of the display but rather a separate element from the display.

The ridge interface 114 can tilt in a number of directions in addition to the right or left as shown in the drawing. The tilting of the ridge interface 114 can cause pressure changes or electrical changes for invoking control of the second device 112 from the first device 104. The tilting action is another example of the gesture 116 of FIG. 1.

Figure 9:
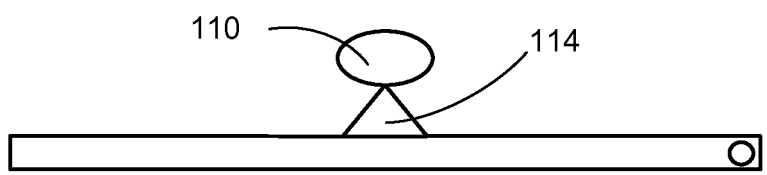
FIG. 9 is a cross-sectional view of a third example of the ridge interface in an operational example.
Figure 9:
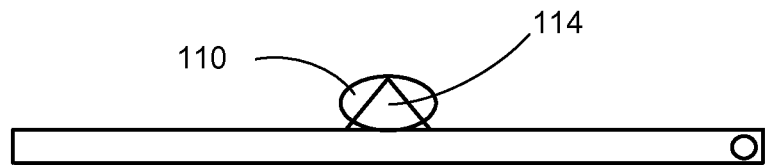

Referring now to FIG. 9, therein is shown a cross-sectional view of a third example of the ridge interface 114 in an operational example. FIG. 9 can depict either the ridge base interface 602 of FIG. 6, the ridge left interface 604 of FIG. 6, or the ridge right interface 606 of FIG. 6.

In this example, the ridge interface 114 is shown having a tiered functionality based on the amount of pressure applied to the ridge interface 114 or the amount of surface contact on the ridge interface 114. For example, the single finger 110 touching only the tip of the ridge interface 114 can invoke a particular response or control for the first device 104, the second device 112, or a combination thereof. The difference in pressure or surface area can also be used to automatically distinguish control of the first device 104 or the second device 112 without any other intervention or control change.

The difference in pressure or surface area can also function as a security measure where one type is used for authorized users and known only to the authorized users. Further, the amount of pressure or surface area can also vary depending on the content being viewed or the type of interaction, again possibly providing added but hidden security protection.

Figure 10:
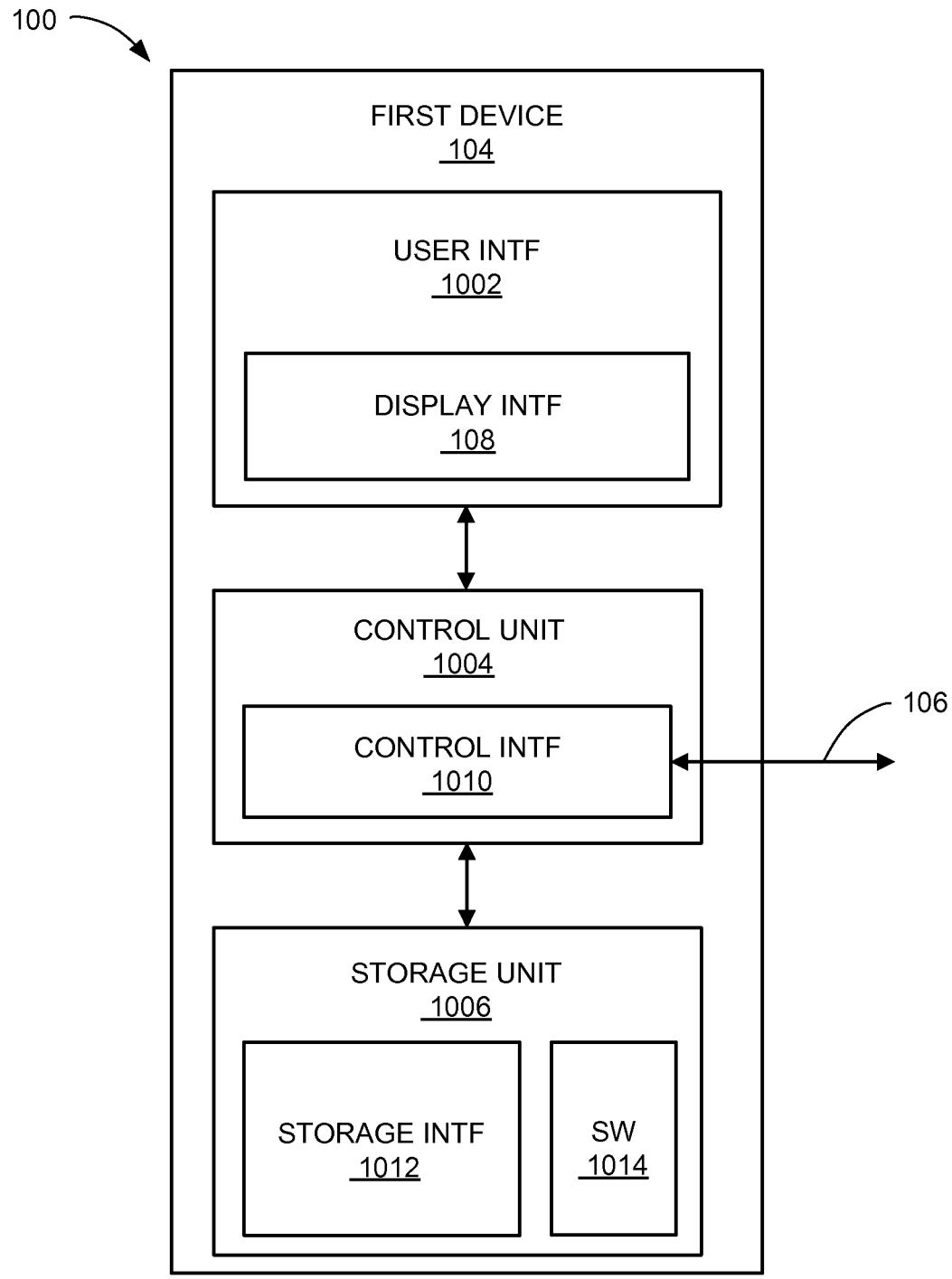
FIG. 10 is an exemplary block diagram of the control system.

Referring now to FIG. 10, therein is shown an exemplary block diagram of the first device 104 of the control system 100. The first device 104 can include a user interface 1002, a control unit 1004, and a storage unit 1006. The user interface 1002 can include the display interface 108 of FIG. 1. The control unit 1004 can include a control interface 1010. The storage unit 1006 can include a storage interface 1012.

The user interface 1002 allows a user to interface and interact with the control system 100. The user interface 1002 can include an input device and an output device. Examples of the input device of the user interface 1002 can include the ridge interface 114, the trackpad 608, a keypad, a touchpad, soft-keys, a keyboard, a microphone, a touch pad, a camera, a webcam or a combination thereof to provide data and communication inputs.

The user interface 1002 can include the display interface 108. Examples of the output device of the user interface 1002 can include the display interface 108. The display interface 108 can include a display, a projector, a video screen, a speaker, or a combination thereof. The display interface 108 can also be a touch screen, such that inputs can be received from the display interface 108.

The control unit 1004 can execute a software 1014 to provide the intelligence of the first device 104. The control unit 1004 can operate the user interface 1002 to display information generated by the first device 104. The control unit 1004 can also execute the software 1014 for the other functions of the first device 104 or the control system 100, including controlling the second device 112. The control unit 1004 can further execute the software 1014 for adjusting and updating the image information to display on or through the display interface 108 of FIG. 1.

The control unit 1004 can be implemented in a number of different manners. For example, the control unit 1004 can be a processor, an embedded processor, a microprocessor, a hardware control logic, a hardware finite state machine, a digital signal processor, or a combination thereof.

The control unit 1004 can include the control interface 1010. The control interface 1010 can be used for communication between the control unit 1004 and other functional units in the control system 100. The control interface 1010 can also be used for communication that is external to the first device 104 or the control system 100.

The control interface 1010 can receive information from the other functional units or from external sources, or can transmit information to the other functional units or to external destinations. The external sources and the external destinations refer to sources and destinations external to the first device 104.

The control interface 1010 can be implemented in different ways and can include different implementations depending on which functional units or external units are interfacing with the control interface 1010. For example, the control interface 1010 can be implemented with a pressure sensor, an inertial sensor, a microelectromechanical system, optical circuitry, waveguides, wireless circuitry, wireline circuitry, or a combination thereof.

The storage unit 1006 can store the software 1014. The storage unit 1006 can also store the relevant information, such as preferred settings, operating system, previous adjustments and updates, or a combination thereof.

The storage unit 1006 can be a volatile memory, a nonvolatile memory, an internal memory, an external memory, or a combination thereof. For example, the storage unit 1006 can be a nonvolatile storage such as non-volatile random access memory, Flash memory, disk storage, or a volatile storage such as static random access memory.

The storage unit 1006 can include the storage interface 1012. The storage interface 1012 can be used for communication between the control unit 1004 and other functional units in the first device 104 or the control system 100. The storage interface 1012 can also be used for communication that is external to the first device 104 or the control system 100.

The storage interface 1012 can receive information from the other functional units or from external sources, or can transmit information to the other functional units or to external destinations. The external sources and the external destinations referred to as sources and destinations external to the first device 104.

The storage interface 1012 can be implemented differently depending on which functional units or external units are being interfaced with the storage unit 1006. The storage interface 1012 can be implemented with technologies and techniques similar to the implementation of the control interface 1010.

The functions described in this application can be hardware implementation or hardware accelerators or circuitry in the control unit 1004. The functions can also be hardware implementation or hardware accelerators or circuitry within the first device 104 but outside of the control unit 1004. The hardware implementation or hardware accelerators or circuitry can be implemented in a number of different manners. For example, the hardware implementation or hardware accelerators can be a hardware control logic, a hardware finite state machine, a memory based control store state machine, or a combination thereof.

As an example, the recognition, interpretation, and execution of the gesture 116, as described in FIG. 1 to FIG. 9, can be performed by the control unit 1004. These functions can also be implemented as hardware implementation or hardware accelerators in the control unit 1004 or within the first device 104 but outside of the control unit 1004. The control unit 1004 can be coupled to the ridge interface 114.

As a further example, the security protection can also be performed by the control unit 1004 described in FIG. 7. The security protection described in FIG. 7 can also be implemented as hardware implementation or hardware accelerators in the control unit 1004 or within the first device 104 but outside of the control unit 1004.

In yet a further example, the control unit 1004 can send the commands 118 over the communication path 106 to the second device 112. The control unit 1004 can execute the commands 118 to help interacts with the second device 112.

For illustrative purposes, FIG. 10 is described as an exemplary block diagram for the first device 104, although it is understood that FIG. 10 can also represent the exemplary block diagram for the second device 112. Examples of the first device 104 and the second device 112 have overlaps as described in FIG. 1 and throughout the detailed description section.

As examples, the second device 112 can also have the control unit 1004 with a control interface 1010 for receiving and interpreting the commands 118 from the first device 104. Although the control unit 1004 can differ between the first device 104 and the second device 112, the functions, operations, and example implementations for the first device 104 as described also applies to the control unit 1004 in the second device 112. The second device 112 can operate based on the commands 118 and the current state 206 of the second device 112, as described in the above figures.

Figure 11:
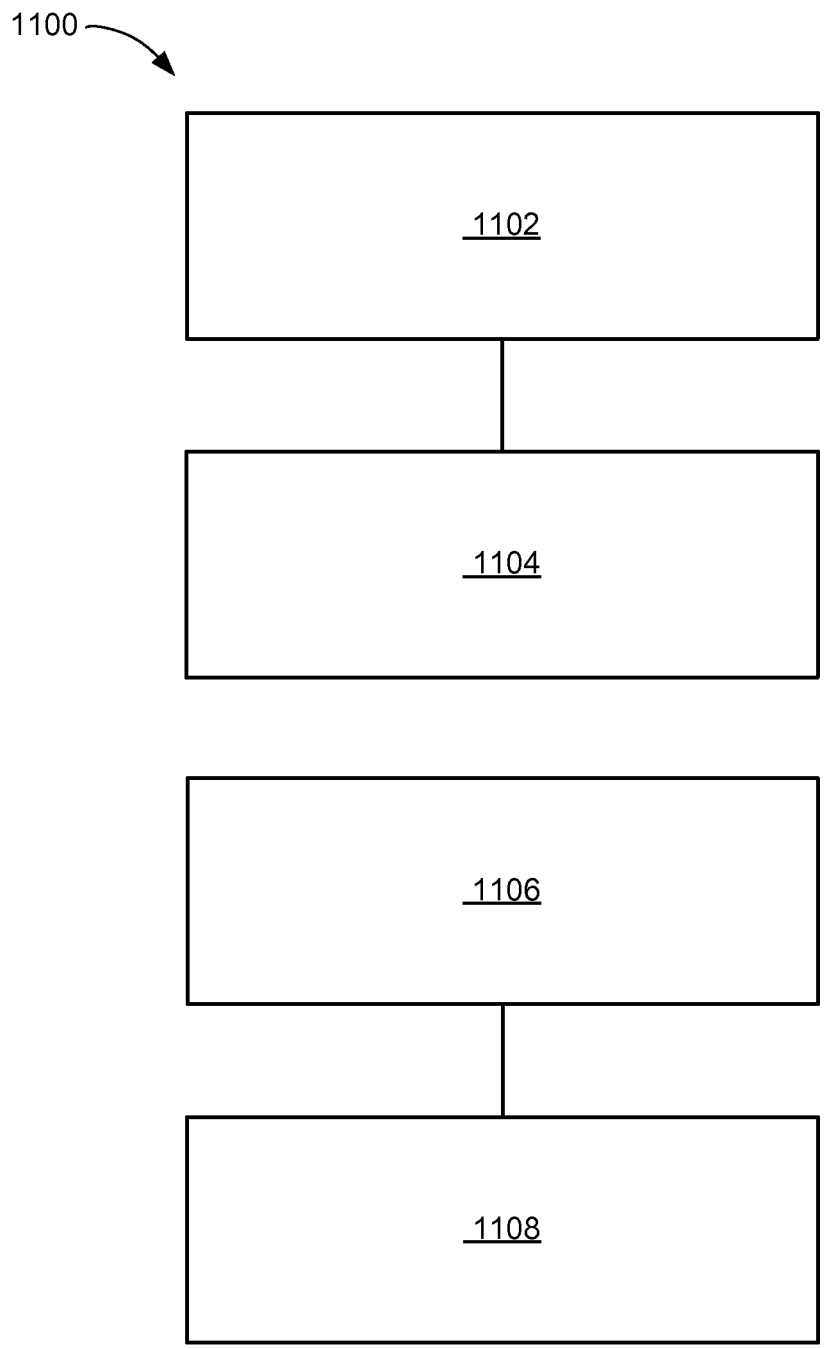
FIG. 11 is a flow chart of a method of operation of a control system in an embodiment of the present invention.

Referring now to FIG. 11, therein is shown a flow chart of a method 1100 of operation of a control system 100 in an embodiment of the present invention. The method 1100 includes: performing a gesture on a ridge interface of a first device in a block 1102; and interpreting the gesture with a control unit for controlling a second device in a block 1104.

The method 1100 also includes: a ridge interface configured to perform a gesture therewith in a block 1106; and a control unit, coupled to the ridge interface, configured to interpret the gesture for controlling a device.

The control system 100 can provide control of the second device 112 of FIG. 1 from the first device 104 of FIG. 1 with the use of only the single finger 110 of FIG. 1 and without having to look at the first device 104 while trying to control or interact with the second device 112. The physical protrusion of the ridge interface 114 of FIG. 1 allows the identification of the relative position of the single finger 110 on the first device 104. The relative position allows a user to perform the gesture 116 of FIG. 1 from the starting position from one side of the ridge interface 114 to the opposite side while maintaining physical contact of the ridge interface 114 throughout the gesture 116. The direction of the gesture 116 and the relative control of the display on the second device 112 swiping from the bottom also allows of the user to easily control the second device 112 without having to look at the first device 104.

The control system 100 can also provide a safe user interface. The first device 104 can be used in a crowded or dangerous environment where having prolonged visual attention on the first device 104 can create a hazardous situation for the user of the first device 104. The tactic identification with the physical protrusion of the ridge interface 114 as well as similarity of control upon the display on the second device 112 as the type of the gesture 116 on the first device 104 allows the user to focus on the second device 112 or the environment without visually focusing on the first device 104.

The control system 100 can further provide a robust control user interface with the use of only the single finger 110. This allows effective and robust control of the second device 112 with only the use of one hand and the single finger 110 from the same hand.

The control system 100 can allow multiple function control using the same type of the gesture 116. The control of the second device 112 with the gesture 116 can vary depending on the current state 206 of FIG. 2 of the second device 112 when the gesture 116 is invoked. In other words, the same gesture can be different effect on the second device 112 depending on the current state 206. In this example, the current state 206 of the second device 112 is shown as a first state 208. The first state 208 has the discrete control icons 202 of FIG. 2 shown on the second device 112. As in FIG. 1, the swiping across the ridge interface 114 controls a display being presented in a swiping manner from the bottom of the display of the second device 112 without regard to the location of the start of the gesture 116 along the length-wise dimension of the ridge interface 114. However, as described above in FIG. 2, the location of the start of the gesture 116 as well as the direction of the swipe of the gesture 116 has a different control effect because of the current state 206 as the first state 208 of FIG. 2 of the second device 112 when the gesture 116 is invoked. Here in FIG. 2, the discrete control icons 202 are already displayed on the second device 112 before the invocation of the gesture 116.

The control system 100 that allows for reliable control of the second device 112 by not requiring the precise location of the single finger 110 along the ridge interface 114 to match the relative position of the target icon 204 on the second device 112. The start of the gesture 116 in this example can default to select the middle available selection and the selection can be changed by the gesture 116 that is a swiping action along the ridge interface 114. This allows reliable control without requiring precise relative position of the single finger 110 along the ridge interface 114 to match the selection on the second device 112. This also allows the selection of the discrete control icons 202 without requiring visual attention to the first device 104.

The control system 100 provides immediate and one-touch control to predetermined options among a numerous options. This allows quick control from the first device 104 to the second device 112 to use the lengthwise ends to invoke controls to the corresponding ends shown on the display of the second device 112, as described in FIG. 4 and FIG. 5, as examples. This end control avoids unnecessary gestures if the ends are desired or more expedient without visual attention to the first device 104 as well as to minimize tactile attention to the first device 104. This is not possible if there is only a single point control or a touch screen without discernible end.

The control system 100 can provide quick and reliable control of the second device 112 because the relative position maps to the location of the control that can be displayed on the second device 112 without unnecessary control steps that needs to be performed on the first device 104. This mapping of the ridge left interface 604 of FIG. 6, the ridge right interface 606 of FIG. 6, and the ridge base interface 602 of FIG. 6 on the first device 104 to the relative position on the second device 112 avoids the need for visual attention on the first device 104 and minimizes the tactile attention and operation on the first device 104.

The control system 100 can provide security protection as well as control interface. The ridge interface 114 can be a multi-purpose interface that provides not only control interface to the second device 112 with the use of the gesture 116 but can also function as the user authentication 702 of FIG. 7 as the gesture 116 interact with the ridge interface 114.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A control system comprising:
  a ridge interface configured to:
    receiving a gesture with the ridge interface permanently and physically protruding from a surface of a display screen;
    detect a size of a contact area on a surface of the ridge interface associated with the gesture for distinguishing control for a tiered functionality; and
  a control unit, coupled to the ridge interface, configured to interpret the gesture and the size of the contact area for controlling a device.

2. The system as claimed in claim 1 wherein the control unit is configured to provide a user authentication without a user's knowledge of the user authentication being performed based on the gesture on the ridge interface.

3. The system as claimed in claim 1 wherein the control unit is configured to provide a user authentication and configured to send a command to hide unauthorized content on the device when the user authentication failed.

4. The system as claimed in claim 1 wherein:
  the ridge interface includes a ridge base interface, a ridge left interface, and a ridge right interface; and
  the control unit is configured to interpret the gesture simultaneously on the ridge base interface and either the ridge right interface or the ridge left interface.

5. The system as claimed in claim 1 wherein the control unit is configured to send a command for operating the device to mimic the action of the gesture on a target icon shown on the device.

6. The system as claimed in claim 1 wherein the control unit is configured to send a command for operating the device based on a current state of the device.

7. The system as claimed in claim 1 wherein the control unit is configured to send a command for operating the device based on the gesture at an end of the ridge interface.

8. The system as claimed in claim 1 wherein the ridge interface includes a ridge base interface, a ridge left interface, and a ridge right interface surrounding a trackpad.

9. The system as claimed in claim 1 wherein the ridge interface includes a ridge base interface, a ridge left interface, and a ridge right interface with the ridge left interface, and the ridge right interface in a perpendicular configuration with the ridge base interface.

10. The system as claimed in claim 3 wherein the control unit is configured to provide the user authentication and configured to send a command to continue to operate the device when the user authentication failed without the user's knowledge of the failure of the user authentication.

11. A method of operation of a control system comprising:
  receiving a gesture on a ridge interface permanently and physically protruding from a surface of a display screen of a first device;
  detecting a size of a contact area on a surface of the ridge interface associated with the gesture for distinguishing control for a tiered functionality; and
  interpreting the gesture and the size of the contact area with a control unit for controlling a second device.

12. The method as claimed in claim 11 wherein interpreting the gesture for controlling the second device includes providing a user authentication without a user's knowledge of the user authentication being performed based on the gesture on the ridge interface.

13. The method as claimed in claim 11 wherein interpreting the gesture includes providing a user authentication for hiding unauthorized content on the second device when the user authentication failed.

14. The method as claimed in claim 11 wherein recognizing the gesture on the ridge interface includes recognizing the gesture simultaneously on a ridge base interface and either a ridge right interface or a ridge left interface.

15. The method as claimed in claim 11 wherein interpreting the gesture for controlling the second device includes sending a command for operating the second device to mimic the action of the gesture on a target icon shown on the second device.

16. A method of operation of a control system comprising:

receiving a command for interacting with a first device based on a gesture and a size of a contact area on a surface of a ridge interface permanently and physically protruding from a surface of a display screen of the first device, the size of the contact area associated with the gesture for distinguishing control for a tiered functionality and the display screen; and operating a second device based on the command and a current state of the second device.

17. The method as claimed in claim 16 wherein:

receiving the command includes receiving a user authentication; and further comprising:

hiding unauthorized content on the second device when the user authentication failed without the user's knowledge of the failure of the user authentication.

18. The method as claimed in claim 16 wherein operating the second device based on the command includes mimicking an action on the second device based on the gesture.

19. The method as claimed in claim 16 wherein receiving the command for interacting with the first device includes receiving the command for interacting with the first device based on the gesture simultaneously on a ridge base interface and either of a ridge left interface or a ridge right interface.

20. The method as claimed in claim 16 wherein:

receiving the command includes receiving a user authentication; and further comprising:

continuing to operate the second device when the user authentication failed without the user's knowledge of the failure of the user authentication.

* * * * *